UNITED STATES PATENT OFFICE.

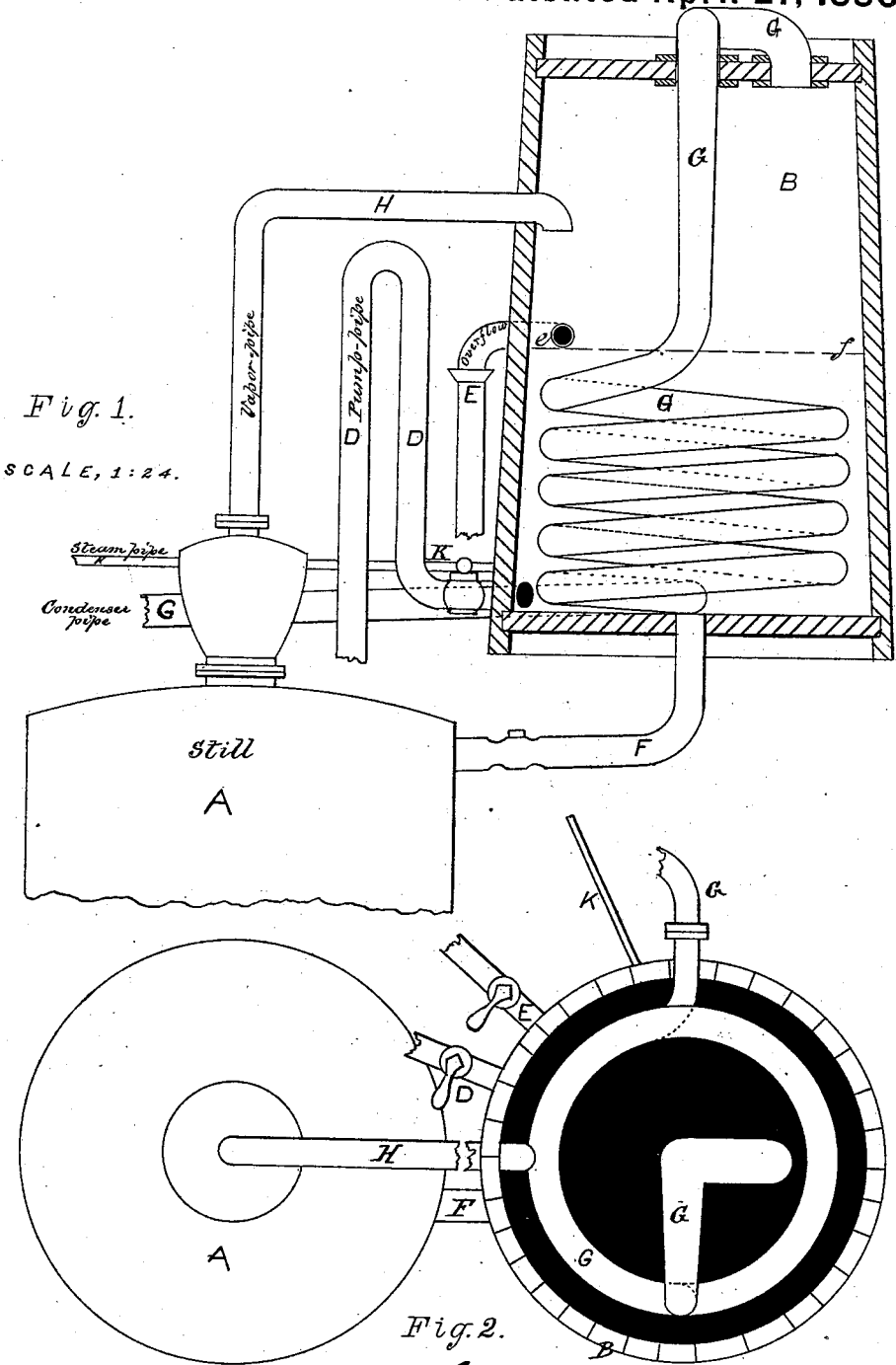

MARTIN V. MONARCH, OF OWENSBOROUGH, KENTUCKY.

SEPARATOR FOR THE DISTILLATION OF WHISKY.

SPECIFICATION forming part of Letters Patent No. 227,035, dated April 27, 1880.

Application filed November 14, 1879.

*To all whom it may concern:*

Be it known that I, MARTIN V. MONARCH, of Owensborough, Daviess county, and State of Kentucky, have invented a new and Improved Charger and Heater for Stills; and I do hereby declare that the following is a full, clear, and exact description of the same.

In alcohol and other stills the vapors arising from the heated liquor have been conducted through a pipe coiled in the tank and allowed to enter another tank at the bottom or below the liquid-level therein. Such method has certain advantages, more especially in point of economy of heat; but in certain processes of distillation, particularly in distilling wort or beer into low wines, the operation, in such arrangement of parts, is attended by a great disadvantage—to wit, light foreign substances, commonly denominated "mealy" or "milky" particles, are carried along with the vapors arising from the beer, and find their way into the condenser, and thus mingle with the condensed product of distillation, impairing its quality and correspondingly lessening its value. To avoid this result I have adopted the construction and arrangement of parts hereinafter described, and shown in accompanying drawings, in which a tank or charger is connected with a still and provided with vapor induction and eduction pipes, constructed and arranged in such manner that the vapors of the still are discharged into the charger at a point above the level of the beer or wort therein, and then enter the condenser-pipe, which is coiled in the charger, whereby foreign substances are allowed to separate from said vapors while in the charger and precipitate into the beer or wort therein, thus eventually returning to the still.

In accompanying drawings, Figure 1 is a side view of a part of a still and a vertical section of a charger and its adjunctive parts constructed according to my invention, and Fig. 2 is a plan and horizontal section of the same parts respectively.

A indicates the still, which may be of the usual construction, and B the charger therefor. The latter is a closed tank or vessel, which is made of wood or copper, the latter being preferable.

The beer or mash is pumped into chamber B through pipe D until it fills the same up to the level *e f* of the overflow-pipe E, whose first joint is preferably made of glass, so that it may be easily perceived when the required quantity or charge of beer has entered the chamber.

The contents or charge of beer in chamber B is discharged through pipe F into the still A at the proper time, and a fresh charge is then pumped into the chamber. What entered still A is then converted into vapor, which passes through pipe H into chamber B. A very small portion of this vapor may at once condense, but the remainder enters the mouth of the pipe G, which opens at the top of the chamber B and is coiled in the lower half of the same, from which it extends to a condenser. (Not shown.) The mealy, milky, and other like or improper substances contained in such vapors from the still are separated from the vapors and precipitated, so that they mingle with the liquid in chamber B, and thus pass back to the still A, in place of passing along with the vapors and entering the condenser, as would be the case if the pipes H and G were connected so as to form a continuous conduit.

It will also be apparent that a like objectionable result would follow if the pipe H were so arranged as to discharge the vapors beneath the surface of the liquid in chamber B, for then the vapors, in passing upward through the liquid, would take up and carry along with them foreign particles in even greater quantity than originally came from the still. The above-described arrangement of the vapor-pipe H is therefore indispensable to the desired perfection of result.

I thus utilize the heat of the low wines or vapors thereof as they pass to the condenser for heating the charge for the still to nearly the boiling-point, and at the same time I prevent escape of the alcoholic vapor arising from the charger, and also separate or eliminate mealy or improper substances from the low wines.

The pipe K serves for introducing steam into the charger and separator B for the purpose of agitating the contents of the same.

What I claim is—

The combination, with the still A and closed tank or charger B, of the overflow-pipe connected with the latter, as shown, the liquid-eduction pipe F, leading from the charger to the stilll, the vapor-induction pipe H, leading direct from the still and entering the charger above the point of liquid-level therein, and the vapor-eduction pipe G, opening at the top of the charger, also coiled in the bottom thereof and leading therefrom to a condenser, all as shown and described, for the purpose specified.

MARTIN VAN BUREN MONARCH.

Attest:
JOHN ALLEN DEAN,
ROBERT BURCH.